United States Patent [19]
Mitsui et al.

[11] Patent Number: 6,108,024
[45] Date of Patent: Aug. 22, 2000

[54] DUAL-PROCESSING TYPE RECORDING APPARATUS FOR CHEMICAL AND THERMAL SENSITIVE MATERIAL

[75] Inventors: Teruo Mitsui, Kasuga; Hideki Sakamoto; Ichiro Maruyama, both of Fukuoka, all of Japan

[73] Assignee: Matsushita Electric Industrial Co., Ltd., Osaka, Japan

[21] Appl. No.: 09/039,484

[22] Filed: Mar. 16, 1998

[30] Foreign Application Priority Data

Jun. 5, 1997 [JP] Japan ................................. 9-147483
Jun. 12, 1997 [JP] Japan ................................. 9-154767

[51] Int. Cl.[7] ................................................. B41J 2/435
[52] U.S. Cl. ...................... 347/250; 347/235; 347/234; 347/248; 355/40; 355/41
[58] Field of Search ................................ 347/250, 251, 347/253, 260, 261; 355/27, 35, 40, 41, 77; 430/30

[56] References Cited

U.S. PATENT DOCUMENTS 5,518,844  5/1996  Matsumoto et al. ...................... 430/30

*Primary Examiner*—N. Le
*Assistant Examiner*—Hai C. Pham
*Attorney, Agent, or Firm*—Stevens, Davis, Miller & Mosher, L.L.P.

[57] ABSTRACT

A recording apparatus records data on a sensitive material with a laser beam. The recording apparatus includes a data storage unit for storing data, a laser illumination unit for generating the laser beam, and a laser beam scanning unit for scanning the laser beam, which is generated by the laser illumination unit, at a predetermined position. The recording apparatus further includes a transporting unit for transporting the sensitive material to the predetermined position, a laser control unit for controlling the laser illumination unit to generate the laser beam on the basis of the data stored in the data storage unit, and an intensity change-over unit for changing over the intensity of the laser beam illuminating the sensitive material at the predetermined position, in dependence on the type of the sensitive material.

8 Claims, 9 Drawing Sheets

DUAL-PROCESSING TYPE RECORDING APPARATUS FOR CHEMICAL AND THERMAL SENSITIVE MATERIAL

BACKGROUND OF THE INVENTION

1. Field of the Invention

The present invention generally relates to a recording apparatus, and especially relates to a recording apparatus such as a phototypesetter, a typesetter, an image setter or the like which is capable of printing or recording data on both a sensitive material destined for the thermal development processing and a sensitive material destined for the chemical development processing.

2. Description of Related Art

In a recording apparatus of the type mentioned above, a film- or strip-like sensitive material is illuminated with a laser beam in a primary scanning direction while the sensitive material is being transported in a secondary scanning direction, whereby latent images are formed on the sensitive material. Subsequently, the sensitive material having the latent images formed thereon undergoes the development processing in an appropriate processor.

In this conjunction, the sensitive materials (which may also be referred to as "photosensitive materials") can generally be classified into a sensitive material which undergoes only the thermal processing for the development of the latent images (hereinafter this type sensitive material will also be referred to as "a sensitive material for thermal development processing") and a sensitive material which is destined to undergo the chemical processing for the development (hereinafter this type sensitive material will also be referred to as "a sensitive material for chemical development processing"). The chemical processing for the development of the sensitive material brings about the necessity for disposing waste liquid or fluid resulting from the development process, which requires lots of time and costs. However, the sensitive material for chemical development processing enjoys very wide use not only in the past but also at present. Similarly, the processor which is used for the sensitive material for chemical development processing has widespread popularity. An advantage brought about by the use of the sensitive material for chemical development processing is seen in that latent images can be formed on the sensitive material with relatively low power of the laser beam.

On the other hand, from the viewpoint of the development processing, the sensitive material for thermal development processing is preferred because the development processing is accompanied by no waste fluid or drainage. However, the number of processors used for the sensitive material for thermal development processing used at present is extremely small when compared with those for the sensitive material for chemical development processing. It is further noted that for forming the latent images on the sensitive material for thermal development processing, approximately one thousand times the laser power is required as compared to the sensitive material for chemical development processing.

When considering the troublesome process, the time and the costs involved in development processing, the use of only the sensitive material for thermal development processing is intrinsically preferred because of the high efficiency of the developing process. However, at present, the sensitive material for chemical development processing must be used as well when considering the situation mentioned above. There exists a demand for a recording apparatus which is compatible with both the sensitive material for thermal development processing and the sensitive material for chemical development processing, so that the apparatus thereby allows the sensitive material for thermal development processing to be used if possible, while being capable of utilizing the sensitive material for chemical development processing if not possible.

However, it should be mentioned that great difficulties are encountered in attempting to provide a single recording apparatus having the sensitive material for thermal development processing and the sensitive material for chemical development processing. A main reason for such difficulty is because hitherto in known or conventional sensitive material for thermal development processing required about one thousand times as high laser power as that for the sensitive material for chemical development processing. Thus, the recording apparatus destined for the sensitive material for thermal development processing has been implemented separately or discretely from the recording apparatus destined only for the sensitive material for chemical development processing. In other words, the demand for a dual-processing type recording apparatus has not been met.

Fortunately, there has been a recent development a sensitive material for thermal development processing which is susceptible to formation of latent images with a laser power of about ten times as high than the laser power required for the sensitive material for chemical development processing.

SUMMARY OF THE INVENTION

In the light of the state of the art described above, it is an object of the present invention to provide a dual-processing type recording apparatus which is capable of providing data recordings on both a sensitive material for chemical development processing and that for thermal development processing.

In view of the above and other objects, which will become apparent as the description is developed, there is provided a dual-processing type recording apparatus for recording data on a sensitive material by using a laser beam, which comprises: a data storage unit for storing data; a laser illuminating unit for generating the laser beam; a laser beam scanning unit for scanning the laser beam, which is generated by the laser illuminating unit, at a predetermined position; a transporting unit for transporting the sensitive material to the predetermined position; a laser control unit for controlling the laser illuminating unit to generate the laser beam on the basis of the data stored in the data storage unit; and an intensity change-over unit for changing over intensity of the laser beam, which illuminates the sensitive material at the predetermined position, dependent upon a type of the sensitive material.

By virtue of the above-mentioned arrangement of the dual-processing type recording apparatus, power levels of the laser beam can be changed over by the intensity change-over unit dependent upon the type of the sensitive material. Thus, the data recording on both the sensitive material for chemical development processing, and that for thermal development processing, can be realized exchangeably by a single (i.e. one and the same) recording apparatus.

The above and other objects, features and attendant advantages of the present invention will be more easily understood by reading the following description of the preferred, embodiments which provide examples thereof, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. Also in the following description, it is to be understood that such terms as "left", "right", "vertical", "horizontal", "upward", "downward" and the like are words of convenience and are not to be construed as limiting terms.

(First Embodiment)

Figure 1:
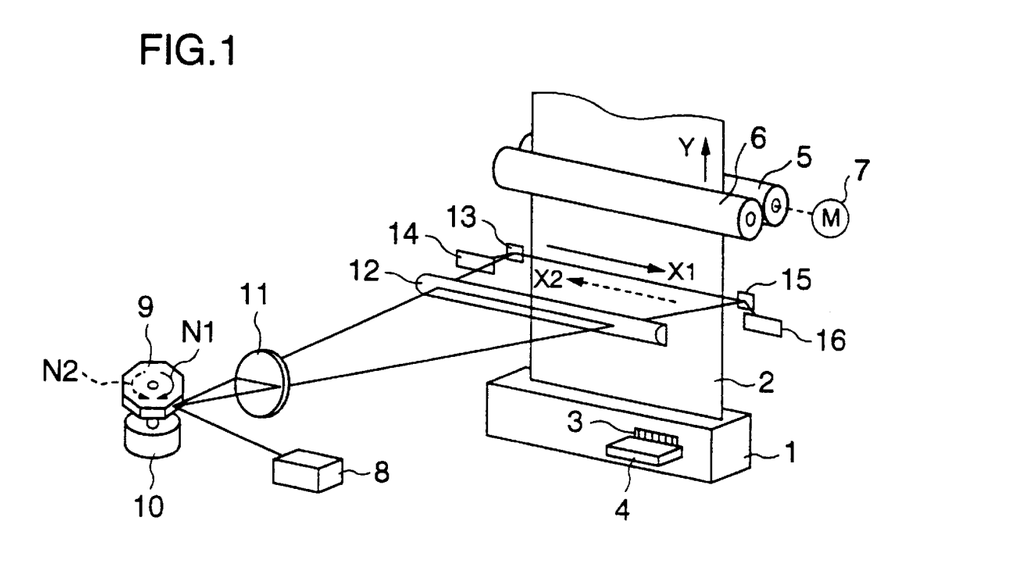
FIG. 1 is a perspective view showing a recording apparatus according to a first embodiment of the present invention.

Description will first be directed to a recording apparatus according to a first embodiment of the present invention. FIG. 1 is a perspective view showing the recording apparatus according to the instant embodiment. Referring to FIG. 1, a magazine 1 serving as container means is implemented in the form of an elongated rectangular parallel-piped or box and adapted to be removably mounted on a main body of the recording apparatus. A sensitive material 2 which is a sensitive material for thermal development processing or that for chemical development processing is accommodated within the magazine 1. The sensitive material 2 may be formed in a film- or strip-like shape and wound in the form of a roll to be conveniently accommodated within the magazine 1. Affixed to a front side of the magazine 1 at a predetermined position is a bar code label 3 on which a bar code is printed for indicating information concerning the sensitive material 2 contained within the magazine 1 such as, for example, the information as to whether the sensitive material 2 accommodated within the magazine 1 is the sensitive material for thermal development processing or that for chemical development, the size information (e.g. width) of the sensitive material 2 and others. The information concerning the sensitive material 2 mentioned above is read out by a bar code reader 4 which thus constitutes means for detecting the type of the sensitive material.

The sensitive material 2 is withdrawn from the magazine 1 upwardly in a vertical direction to be transported in the secondary scanning direction Y, being sandwiched between a feed roller 5 disposed horizontally and a guide roller 6 disposed in opposition to the feed roller 5. The feed roller 5 is driven by a feed motor 7 which serves as transporting means and rotates in the direction for feeding the sensitive material 2 in the secondary scanning direction Y.

Next, description will turn to laser illumination means. A laser illumination unit 8 is designed to output a laser beam having power on the order of 10 mW for the sensitive material for thermal development processing while outputting a laser beam of power on the order of 1 mW for the sensitive material for chemical development processing. The laser beam emitted from the laser illumination unit 8 is deflected or swept in the primary scanning direction by a polygon mirror 9 serving as laser beam scanning means to pass through an F θ-lens 11 and a long lens 12 to form a light spot on the sensitive material 2 at a horizontal line located at a redetermined height from the magazine 1 (i.e. at a predetermined position).

Disposed on the above-mentioned horizontal line at the left side of the sensitive material 2 are a mirror 13 for reflecting the spot light and a first line sensor 14 which serves as a first sensor onto which the spot light reflected at the mirror 13 (i.e. spot light having the optical path changed by the mirror 13) impinges. In response to the impingement of the spot light, the first line sensor 14 generates a line synch for the sensitive material for thermal development processing. Further, disposed at the right side of the sensitive material 2 are a mirror 15 for reflecting the spot light and a second line sensor 16 which serves as a second sensor onto which the spot light reflected at the mirror 15 (i.e. spot light having the optical path changed by the mirror 15) impinges. In response to the impingement of the spot light, the second line sensor 16 generates a line synch for the sensitive material for chemical development processing.

When the type of the sensitive material 2 contained within the magazine 1 which is read out by the bar code reader 4 indicates the material for thermal development processing, a first primary scanning direction X1 is selected. In that case, the spot light 25 beam is reflected at the mirror 13 at the left side of the sensitive material 2 to impinge onto the first line sensor 14, whereon the spot light beam moves to the right to traverse the sensitive material 2 rightwardly. On the other hand, when the type of the sensitive material 2 contained within the magazine 1 which is read out by the bar code reader 4 indicates the sensitive material for chemical development processing, a second primary scanning direction X2 is selected. In that case, the spot light beam is reflected at the mirror 15 located at the right side of the sensitive material 2 to impinge onto the second line sensor 16, whereon the spot light beam moves to the left to traverse the sensitive material 2 leftwardly.

Figure 2:
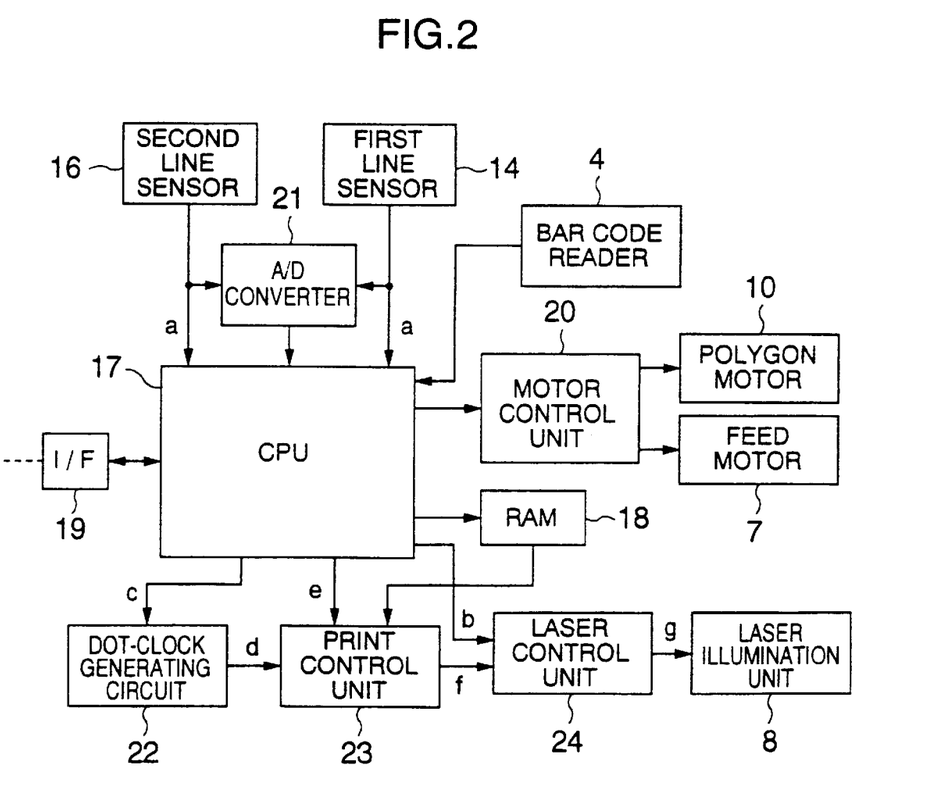
FIG. 2 is a block diagram showing a general configuration of the recording apparatus shown in FIG. 1.
Figure 3A:
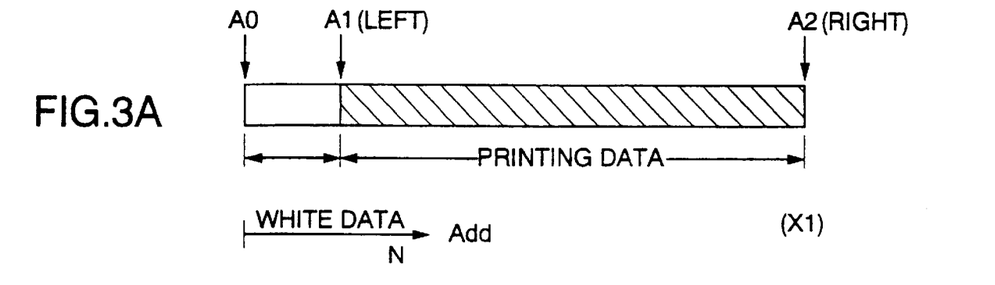
FIG. 3A is a view for illustrating a structure of data for recording on a line-by-line basis on a sensitive material for thermal development processing in the recording apparatus shown in FIG. 1.
Figure 3B:
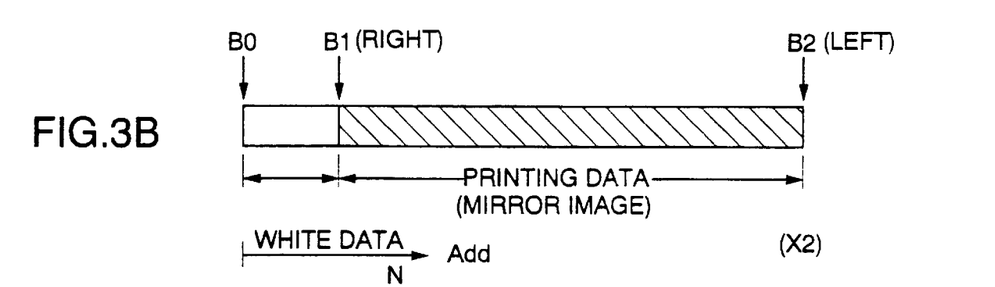
FIG. 3B is a view for illustrating a structure of data for recording on a line-by-line basis on a sensitive material for chemical development processing in the recording apparatus shown in FIG. 1.

FIG. 2 is a block diagram showing the general arrangement of the recording apparatus according to the instant embodiment. Referring to FIG. 2, a CPU (central processing unit) 17 is designed or programmed to serve as intensity change-over means and scanning direction change-over means for controlling other components in accordance with a procedure illustrated in a flow chart of FIG. 4. A RAM (random access memory) 18 serving as data storage means is accessed by the CPU 17, whereby each line data is stored in the RAM 18 as image data of such a structure as illustrated in FIG. 3A or 3B. More specifically, FIG. 3A illustrates data structure for recording on the sensitive material for thermal development processing, whereas FIG. 3B illustrates the data structure for recording on the sensitive material for chemical development processing. In this conjunction, it should be mentioned that the addresses are incremented from the left to the right, as is indicated by arrows N in FIGS. 3A and 3B.

Referring to FIG. 3A, white data irrelevant to printing data (i.e. data for printing) are stored in the RAM 18 sequentially from a start address A0 to a leftmost data address A1 on a line-by-line basis, while the printing data are stored sequentially starting from the leftmost data address A1 to the rightmost data address A2. More specifically, the white data stored at the start address A0 to the leftmost data address A1 represents the length or distance from the first line sensor 14 to the left side edge of the sensitive material 2, and thus the CPU 17 sets the white data according to the size of the sensitive material 2.

On the other hand, in the data structure for the sensitive material for chemical development processing as illustrated in FIG. 3B, the white data are stored sequentially from the start address B0 to the rightmost data address B1, similarly to the data structure illustrated in FIG. 3A. However, the white data now under consideration represents the length or distance from the second line sensor 16 to the right side edge of the sensitive material 2.

It should be noted that the printing data in the data structure shown in FIG. 3B bears a mirror-image relation to the printing data shown in FIG. 3A. More specifically, in the data structure shown in FIG. 3B, the data sampled latest is stored at the rightmost data address B1 while the data sampled earliest is stored at the leftmost data address B2.

Referring back to FIG. 2, an interface (I/F) 19 is provided for transferring information between the recording apparatus and an external host system (not shown) to which the recording apparatus is connected. A motor control unit 20 includes motor drivers for driving a polygon motor 10 (see FIG. 1) and the feed motor 7 under the control of the CPU 17. The motor control unit 20 is so designed that when the first primary scanning direction X1 is selected, the polygon mirror 9 rotates in the direction indicated by an arrow N1 in FIG. 1, while the polygon mirror 9 is caused to rotate in the direction indicated by an arrow N2 when the second primary scanning direction X2 is selected. The motor control unit 20 is adapted to drive rotationally the feed motor 7 so that the sensitive material 2 is transported in the secondary scanning direction Y.

An A/D (analogue-to-digital) converter 21 is provided for converting the output signal of the first line sensor 14 or of the second line sensor 16 into a corresponding digital signal to be output to the CPU 17. Thus, the CPU 17 not only receives the line synch a from the first line sensor 14 or from the second line sensor 16 but also monitors on the basis of the output data of the A/D converter 21 whether or not the sensitive material 2 is illuminated with the laser beam of proper or appropriate power. A dot-clock generating circuit 22 responds to a clock generating signal c supplied from the CPU 17 to start to generate a high-frequency clock signal which is supplied to a print control unit 23 as a dot-clock signal d. In response to the input of a print enable signal e supplied from the CPU 17, the print control unit 23 reads out the data from the RAM 18 only when the print enable signal e is validated, to thereby output printing data f to a laser control unit 24 serving as laser control means. The laser control unit 24 in turn outputs a laser lighting signal g to the laser illumination unit 8 in response to the reception of the printing data f while responding to a forced lighting signal b supplied from the CPU 17 to thereby trigger the operation of the laser illumination unit 8 regardless of the printing data f. The CPU 17 may be so designed or programmed as to control the laser control unit 24 such that the intensity or power of the laser beam emitted from the laser illumination unit 8 is on the order of 10 mW for the sensitive material for thermal development processing while the power of the laser beam is on the order of 1 mW for the sensitive material for chemical development processing.

Figure 4:
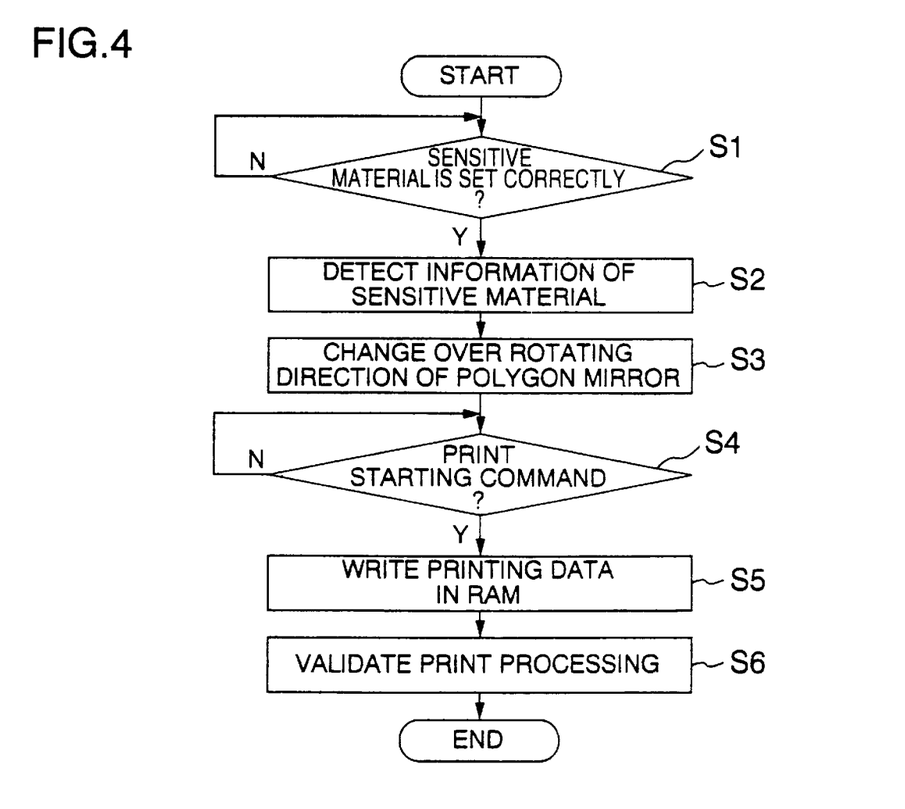
FIG. 4 is a flow chart for illustrating a control procedure of the recording apparatus shown in FIG. 1.
Figure 5:
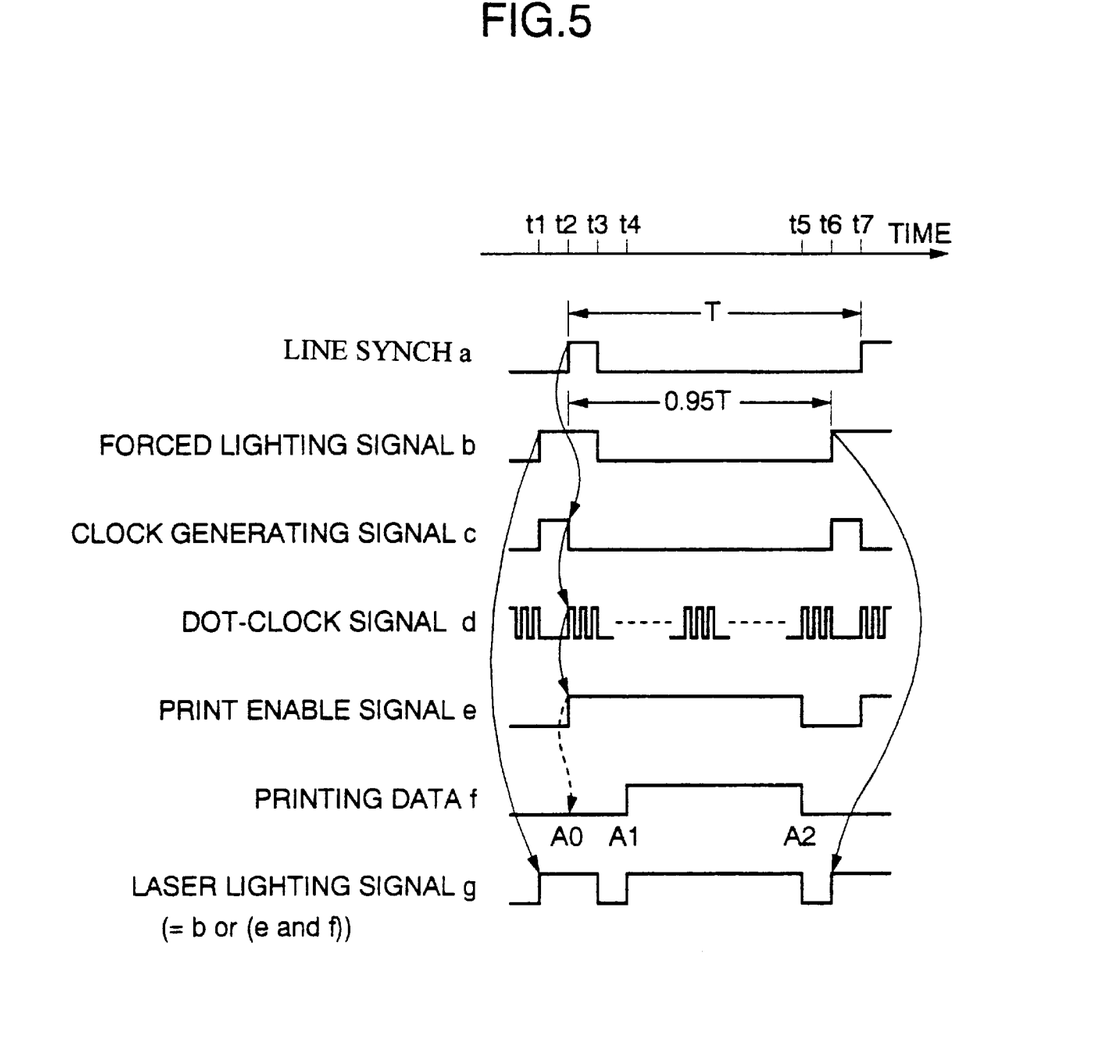
FIG. 5 is a timing chart for illustrating operation of the recording apparatus shown in FIG. 1.

FIG. 4 is a flow chart for illustrating a control procedure in the recording apparatus according to the instant embodiment, and FIG. 5 is a timing chart for illustrating operation of the recording apparatus according to the instant embodiment. Now, referring to FIGS. 4 and 5, description will be made of operation of the recording apparatus according to the instant embodiment. In step S1, the CPU 17 waits for correct positioning of the sensitive material 2, whereon the CPU 17 fetches the information concerning the sensitive material 2 from the output of the bar code reader 4 to thereby identify discriminatively the type of the sensitive material 2 in step S2. Subsequently, in step S3, the rotational direction of the polygon motor 10 is set such as indicated by the arrow N1 (see FIG. 1) when the sensitive material information indicates that the sensitive material 2 is the sensitive material for thermal development processing, while the rotational direction of the polygon motor 10 is set to the direction indicated by the arrow N2 (FIG. 1) when the sensitive material information indicates that the sensitive material 2 is the sensitive material for chemical development processing. The CPU 17 regulates the power of the laser beam emitted from the laser illumination unit 8 in dependence on the type of the sensitive material 2 as described previously.

Subsequently, in step S4, the CPU 17 waits for a printing start command incoming from the external host system by way of the interface (I/F) 19. Upon reception of the print start command, the CPU 17 writes the printing data as received into the RAM 18 (see FIG. 2) at step S5. In that case, the white data according to the size of the sensitive material 2 placed within the magazine 1 is added on a line-by-line basis, whereon the data is stored in the RAM 18 in such manner as illustrated in FIG. 3A when the sensitive material 2 is the sensitive material for thermal development processing while storing in such manner as illustrated in FIG. 3B when the sensitive material 2 is the sensitive material for chemical development processing. In succession, the print processing which will be described below is performed for the whole data written in the RAM 18 (step S6).

The print processing is executed in accordance with a procedure illustrated in a time chart of FIG. 5. The print processing will now be described on the assumption that the sensitive material 2 is the sensitive material for thermal development processing, being understood that the print processing is performed in a similar manner for the sensitive material for chemical development processing with some exceptions. The CPU 17 activates the forced lighting signal b during a time period from time point t1, which corresponds to a time lapse of 0.95 T (where T represents one period) from the rise of the line synch a, to the rise of a succeeding line synch a, as a result of which the laser lighting signal g becomes on (i.e. active). In this manner, the laser illumination unit 8 is forcibly lit outside of the printing region in order to allow the horizontal synchronization to be established by making use of the output signal of the first line sensor 14.

Upon incidence of the spot light on the first line sensor 14 at time point t2, the line synch a becomes active, and at that time point, the CPU 17 makes active both the clock generating signal c (LO active) and the print enable signal e. Parenthetically, the time span intervening between the rise of the given line synch a and that of the succeeding line synch a represents the aforementioned the time period T of the print processing for one line.

In response to the activation of the clock generating signal c, the dot-clock generating circuit 22 starts to output the dot-clock signal d to the print control unit 23. The print control unit 23 which responds to the activation of the print enable signal e reads out the data for one current line from the RAM 18. The data read operation is performed, starting from the start address A0. In that case, since the data as read out is the white data, only the forced lighting signal b is reflected onto the laser lighting signal g. Subsequently, at time point t3, the spot light passes through the first line sensor 14. Consequently, the line synch a becomes non-active, in synchronism with the forced lighting signal b which is rendered non-active by the CPU 17.

At time point t4, the address of the RAM 18 coincides with the leftmost data address A1. Thus, the laser beam recording conforming to the printing data is carried out in timing with the dot-clock signal d up to time point t5. At time point t6 at which the time (0.95 T) determined by multiplying the time period T by a predetermined coefficient (0.95 in the case of the instant embodiment) has lapsed from the rise of the line synch a (time point t2), the forced lighting signal b is again made active to make preparation for establishing the horizontal synchronization for a succeeding line. At time point t7, the succeeding line synch a is detected.

Figure 6A:
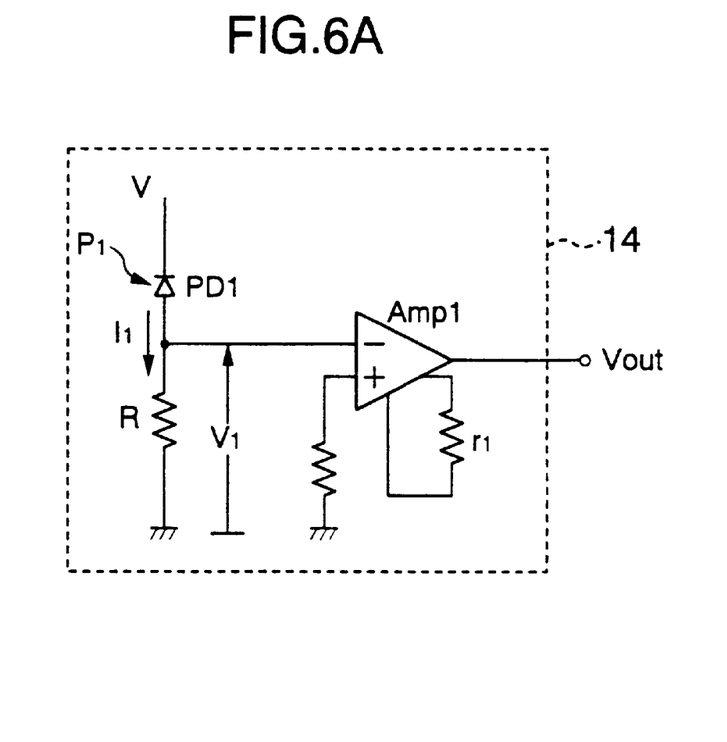
FIG. 6A is a block diagram showing a circuit configuration of a first line sensor employed in the recording apparatus shown in FIG. 1.
Figure 6B:
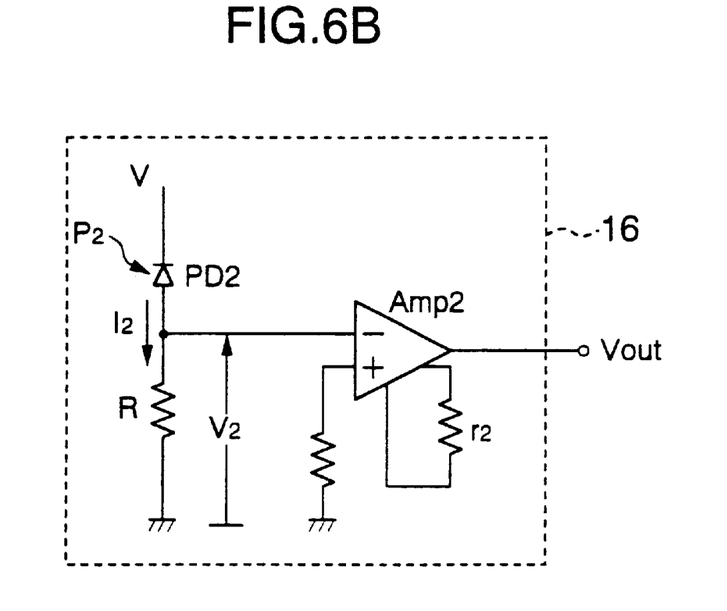
FIG. 6B is a block diagram showing a circuit configuration of a second line sensor employed in the recording apparatus shown in FIG. 1.

FIG. 6A is a block diagram showing a circuit configuration of the first line sensor 14 employed in the recording apparatus according to the instant embodiment, and FIG. 6B is a block diagram showing a circuit configuration of the second line sensor 16 employed in the recording apparatus according to the instant embodiment. As can be seen from the these figures, the first line sensor 14 comprises a photodiode PD1, a differential amplifier Amp1, and resistors R and r1. Similarly, the second line sensor 16 comprises a photodiode PD2, a differential amplifier Amp2, and resistors R and r2. In general, the relation between the power P (W) of the laser beam incident on the photodiode PD and the current I (A) generated by the photodiode PD in response to the incident laser beam is given by the following expression:

$$I(A)=S(A/W) \times P(W)$$

where S represents the sensitivity of the photodiode PD which assumes a value in dependence on the type or species of the photodiode PD actually employed.

The photodiode PD has a maximum permissible power level Pmax for the power P of the incident laser beam, wherein the maximum permissible power level Pmax is in reverse proportion to the sensitivity S. In other words, the maximum permissible power level Pmax is low when the sensitivity S is large and vice versa.

Accordingly, for the photodiode PD exhibiting high sensitivity S, the current I of relatively large magnitude can be obtained even with the laser beam of the relatively low power P. Consequently, it will be unnecessary to set the gain G of the amplifier Amp at an excessively large value. In that case, however, the sensor is not suited for detecting the incident laser beam of higher power P because the maximum permissible power level Pmax is low. By contrast, the photodiode PD of low sensitivity S is suited for detecting the incident laser beam of high power P, because the maximum permissible power level Pmax is high. However, when the power P is low, there is unavailable a sufficiently large current I, which in turn necessitates setting of the gain G of the amplifier Amp at a large value, to a disadvantage.

In consideration of the conditions mentioned above, in the first line sensor 14 and the second line sensor 16 employed in the recording apparatus according to the instant embodiment, the values of the resistors r1 and r2 are so selected that the ratio of gains between the amplifiers Amp1 and Amp2 is 1:5 on the presumption that the power P1 of the incident laser beam for the sensitive material for thermal development processing is 10 mW with the power P2 of the incident laser beam for the sensitive material for chemical development processing being 1 mW, and that the sensitivities S of the photodiodes PD1, PD2 are 0.3 (mA/W) and 0.6 (mA/W), respectively.

(Second Embodiment)

Figure 7:
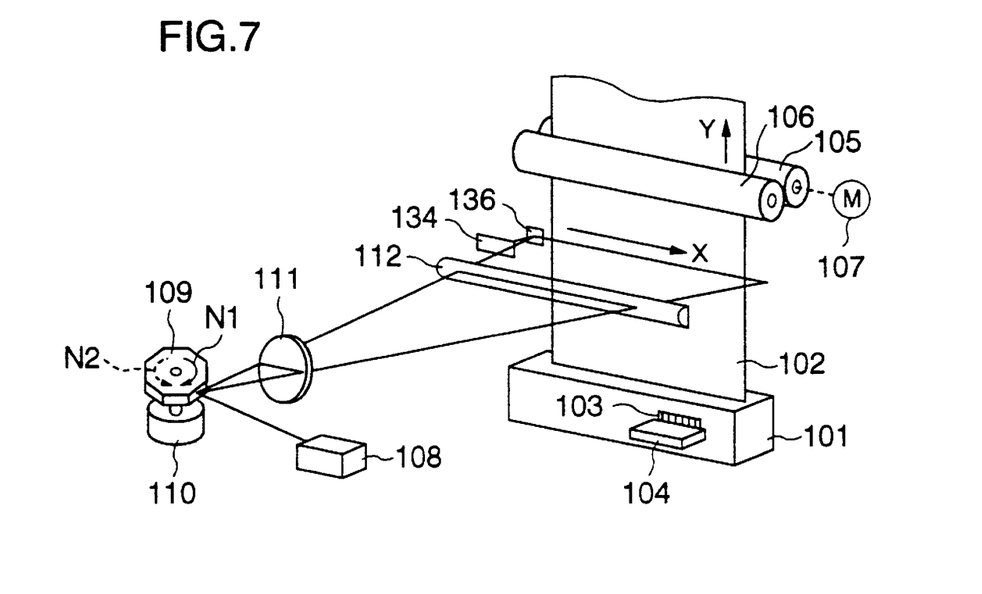
FIG. 7 is a perspective view showing a recording apparatus according to a second embodiment of the present invention.

Next, description will be directed to a recording apparatus according to a second embodiment of the present invention. FIG. 7 is a perspective view showing the recording apparatus according to the instant embodiment. Referring to FIG. 7, a magazine 101 implemented in the form of an elongated rectangular parallelpiped or box contains a sensitive material 102 which may be a sensitive material for thermal development processing or that for chemical development processing. The sensitive material 102 is wound in the form of a roll. Affixed to the front of the magazine 101 at a predetermined position is a bar code label 103 on which a bar code is printed for indicating information concerning the sensitive material 102 such as the sensitive material type information indicating whether the sensitive material 102 accommodated within the magazine 101 is the sensitive material for thermal development processing or that for chemical development processing, the size information (e.g. width) of the sensitive material 102 and so forth. The sensitive material information is read by a bar code reader 104 which thus constitutes means for detecting the type of the sensitive material.

The strip-like sensitive material 102 is withdrawn from the magazine 101 upwardly in the vertical direction to be transported in the secondary scanning direction Y, being sandwiched between a feed roller 105 disposed horizontally and a guide roller 106 disposed in opposition to the feed roller 105. The feed roller 105 is driven by a feed motor 107 which serves as transporting means and rotates in the direction for feeding the sensitive material 102 in the secondary scanning direction Y.

Next, description will turn to laser illumination means. A laser illumination unit 108 is designed to output a laser beam having power on the order of 10 mW for the sensitive material for thermal development processing while outputting a laser beam of power on the order of 1 mW for the sensitive material for chemical development processing. The laser beam emitted from the laser illumination unit 108 is deflected or swept in the primary scanning direction by a polygon mirror 109 serving as laser beam scanning means to pass through an Fθ lens 111 and a long lens 112 to form a light spot on the sensitive material 102 at a horizontal line located at a predetermined height from the magazine 101 (i.e. at a predetermined position).

A first line sensor 134, which serves as a first sensor for generating a line synch for the sensitive material for chemical development processing, and a second line sensor 136, which serves as a second sensor for generating a line synch for the sensitive material for thermal development processing, are disposed along the horizontal line at the left side of the sensitive material 102 (at the starting position of line scanning operation).

With the arrangement described above, the spot light beam first impinges on the first line sensor 134 disposed at the left side of the sensitive material 102 and then impinges onto the second line sensor 136, whereon the spot light beam moves to the right (as indicated by an arrow X) to traverse the sensitive material 102 rightwardly.

Figure 8:
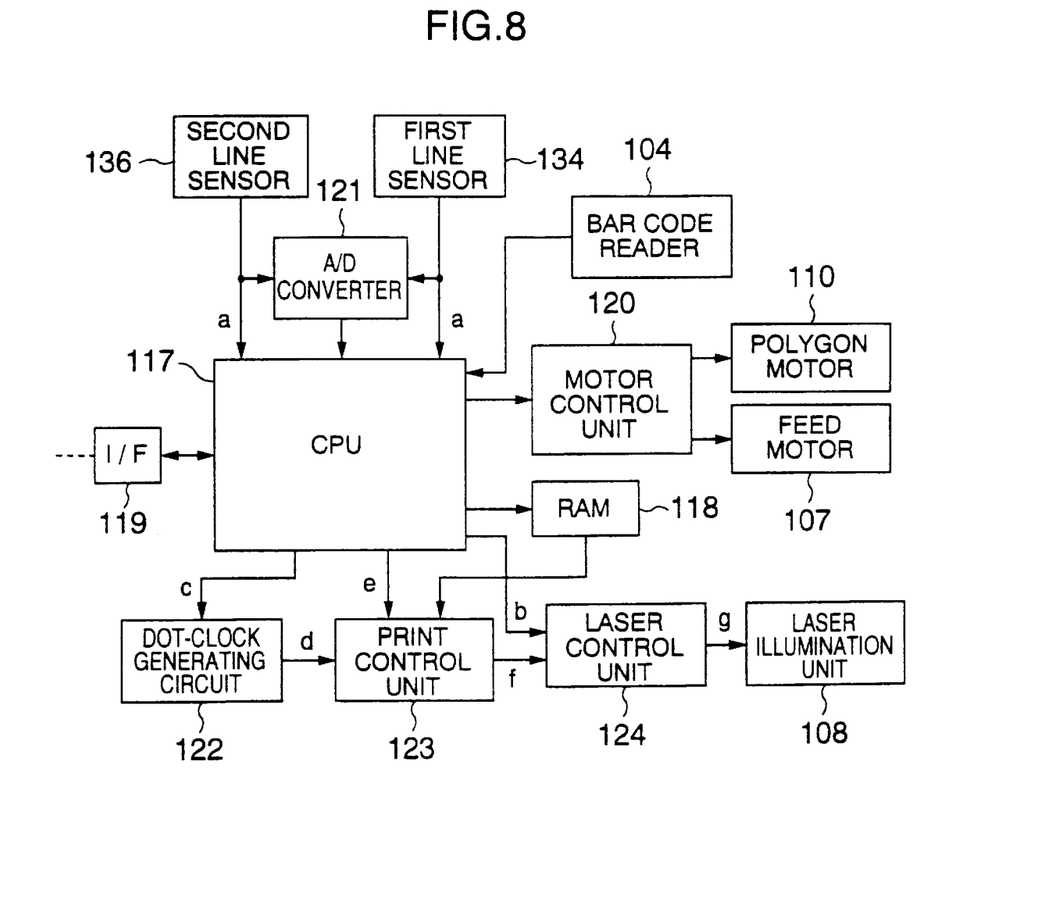
FIG. 8 is a block diagram showing a configuration of the recording apparatus shown in FIG. 7.
Figure 9A:
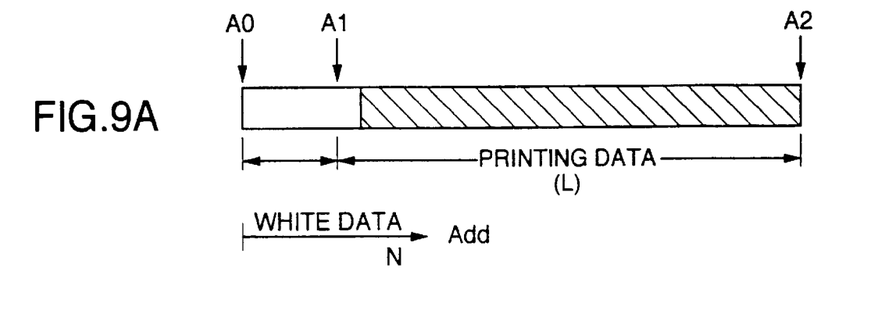
FIG. 9A is a view for illustrating a structure of data for recording on a line-by-line basis on a sensitive material for chemical development processing in the recording apparatus shown in FIG. 7.
Figure 9B:
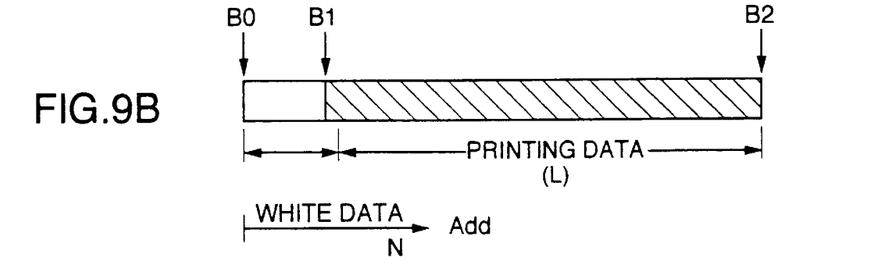
FIG. 9B is a view for illustrating a structure of data for recording on a line-by-line basis on a sensitive material for thermal development processing in the recording apparatus shown in FIG. 7.

FIG. 8 is a block diagram showing a configuration of the recording apparatus according to the instant embodiment. Referring to FIG. 8, a CPU 117 is designed or programmed to serve as intensity change-over means and scanning direction change-over means for controlling other components in accordance with a procedure illustrated in a flow chart of FIG. 10. A RAM 118 serving as data storage means is accessed by the CPU 117, whereby each line data is stored in the RAM 118 as image data of such a structure as illustrated in FIG. 9A or 9B. FIG. 9A illustrates a data structure for recording on the sensitive material for chemical development processing, whereas FIG. 9B illustrates the data structure for recording on the sensitive material or thermal development processing. It is to be noted that addressing is performed in the direction from the left to the right, as indicated by arrows N in FIGS. 9A and 9B.

Referring to FIG. 9A, white data which is irrelevant to printing data (i.e. data for printing) is stored in the RAM 118 sequentially from a start address A0 to the leftmost data address A1 on a line-by-line basis. The printing data are stored sequentially and forwardly, starting from the leftmost data address A1 to the rightmost data address A2. More specifically, the white data stored at the start address A0 to the leftmost data address A1 represents the distance from the first line sensor 134 to the left side edge of the sensitive material 102, and thus the white data set by the CPU 117 corresponds to the size of the sensitive material 102.

On the other hand, in the data structure for the sensitive material for thermal development processing as illustrated in FIG. 9B, the white data are stored sequentially from the start address B0 to the rightmost data address B1 similarly to the data structure illustrated in FIG. 9A. The white data now under consideration represents the distance from the second line sensor 136 to the left side edge of the sensitive material 102. It can be seen from FIG. 7 that the distance between the left side of the sensitive material 102 and the first line sensor 134 is different from the distance intervening between the left side of the sensitive material 102 and the second line sensor 136, which results in that the lengths of the white data illustrated in FIG. 9A and FIG. 9B are different from each other in proportion to the distances mentioned above.

However, the length L of the printing data of itself remains same in both the data structures shown in FIGS. 9A and 9B so long as the sensitive materials 102 have the same size.

Referring back to FIG. 8, an interface (I/F) 119 is provided for transferring information between the recording apparatus and an external host system (not shown) to which the recording apparatus is connected. A motor control unit 120 includes motor drivers for driving a polygon motor 110 (see FIG. 7) and the feed motor 107 under the control of the CPU 117. The motor control unit 120 is so designed that when a first primary scanning direction X1 is selected, the polygon mirror 109 is rotated in the direction indicated by an arrow N1 in FIG. 7, while the polygon mirror 109 is caused to rotate in the direction indicated by an arrow N2 when a second primary scanning direction X2 is selected. Additionally, the motor control unit 120 is designed to drive rotationally the feed motor 107 so that the sensitive material 102 is transported in the secondary scanning direction Y.

An A/D converter 121 is provided for converting the output signal of the first line sensor 134 or the second line sensor 136 into a corresponding digital signal to output the digital signal to the CPU 117. Thus, the CPU 117 not only receives the line sink a from the first line sensor 134 or from the second line sensor 136 but also monitors on the basis of the output data of the A/D converter 121 whether or not the sensitive material 102 is illuminated with the laser beam of proper or appropriate power.

A dot-clock generating circuit 122 responds to a clock generating signal c issued from the CPU 117 to start to generate a high-frequency clock signal which is supplied to a print control unit 123 as a dot-clock signal d. In response to the input of a print enable signal e issued from the CPU 117, the print control unit 123 reads out the data from the RAM 118 only when the print enable signal e is validated or enabled, to thereby output printing data f to a laser control unit 124 serving as laser control means. The laser control unit 124 in turn outputs a laser lighting signal g to the laser illumination unit 108 in response to the reception of the printing data f while responding to a forced lighting signal b issued from the CPU 117 to thereby trigger the operation of the laser illumination unit 108 regardless of the printing data f. Incidentally, the CPU 117 may be so designed or programmed as to control the laser control unit 124 such that the intensity or power of the laser beam emitted from the laser illumination nit 108 is on the order of 10 mW for the sensitive material for thermal development processing, while the power of the laser beam is on the order of 1 mW for the sensitive material for chemical development processing.

Figure 10:
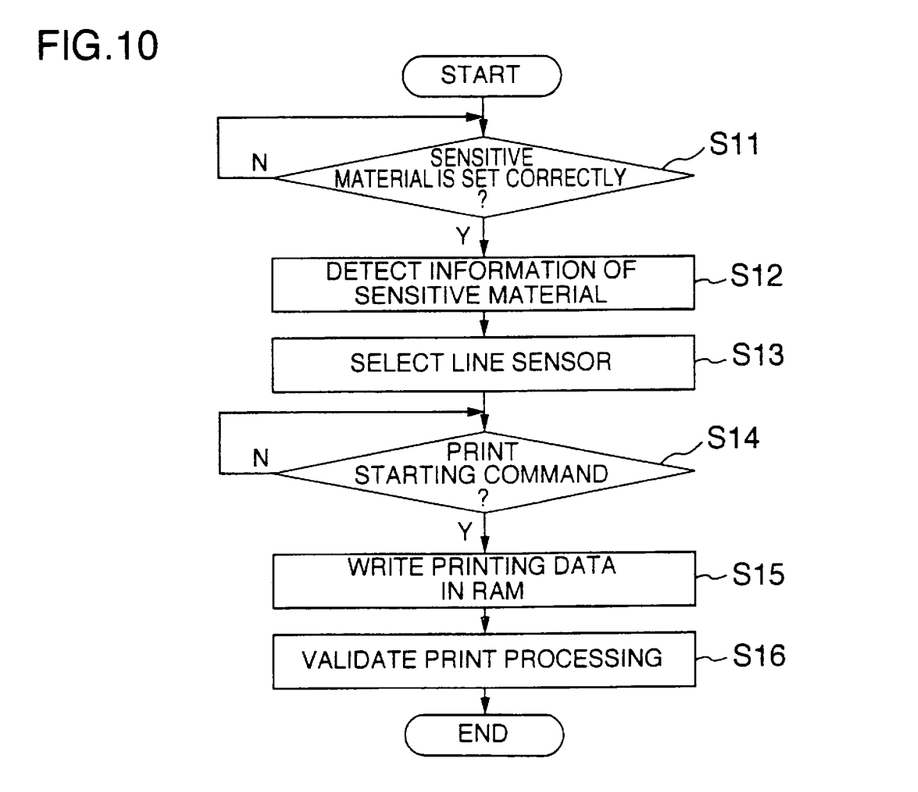
FIG. 10 a flow chart for illustrating a control procedure in the recording apparatus shown in FIG.
Figure 11:
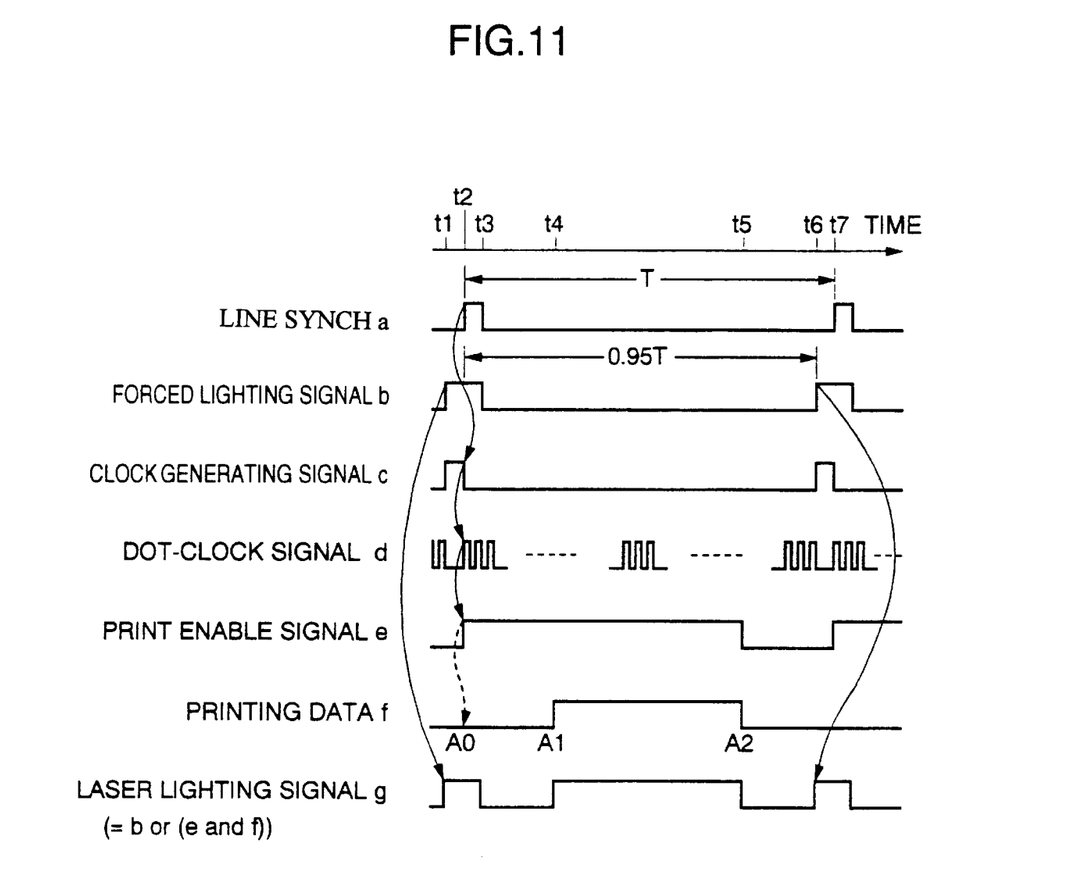
FIG. 11 is a timing chart for illustrating operation of the recording apparatus shown in FIG. 7.
Figure 12:
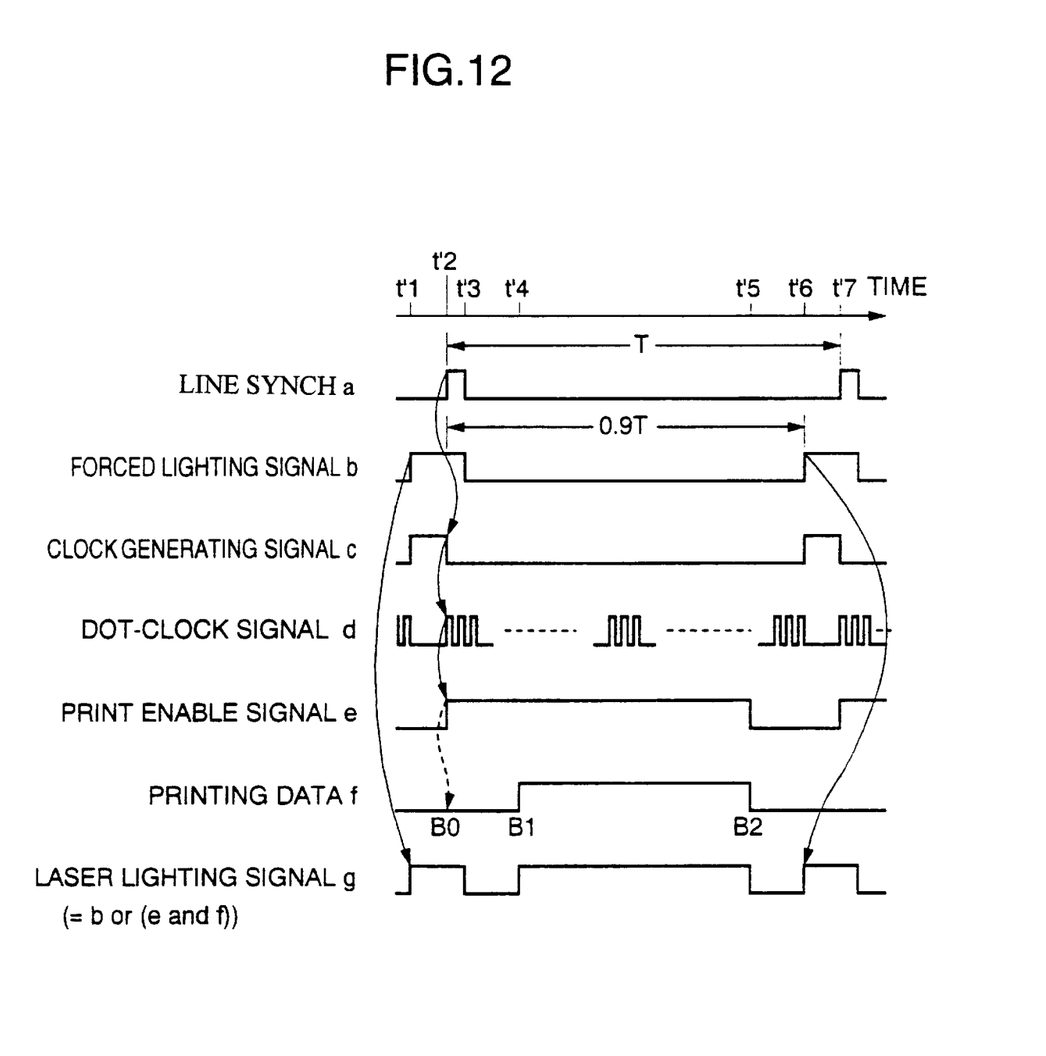
FIG. 12 a timing chart for illustrating operation of the recording apparatus shown in FIG. 7.

FIG. 10 is a flow chart for illustrating a control procedure in the recording apparatus according to the instant embodiment, and FIGS. 11 and 12 are timing charts for illustrating operations of the recording apparatus according to the instant embodiment. Referring to FIGS. 10 and 11, the description will be directed to the operation of the recording apparatus on the assumption that the sensitive material for chemical development processing is used. In step S11, the CPU 117 waits for correct positioning of the sensitive material 102, whereon the CPU 117 fetches the sensitive material information from the output of the bar code reader 104 to thereby identify discriminatively the type of the sensitive material 102 in step S12. Subsequently, in step S13, the first line sensor 134 is activated when the sensitive material information indicates that the sensitive material 102 is the sensitive material for chemical development processing, while the second line sensor 136 is activated when the sensitive material information indicates that the sensitive material 102 is the sensitive material for thermal development processing. Parenthetically, in the case of the instant embodiment, it is assumed that the sensitive material for chemical development processing is employed. Thus, only the first line sensor 134 is activated. The CPU 117 regulates the power of the laser beam emitted from the laser illumination unit 108 dependent upon the type of the sensitive material, as described previously.

Subsequently, in step S14, the CPU 117 waits for a printing start command incoming from the external host system by way of the interface (I/F) 119. Upon reception of the print start command, the CPU 117 writes the printing data as received into the RAM 118 (FIG. 8) at step S15. In that case, the white data indicative of the distance from the left end of the sensitive material 102 placed within the magazine 1 to the first line sensor 134 is added on a line-by-line basis, whereon the data is stored in the RAM in such manner as illustrated in FIG. 9A. In succession, the print processing which will be described below is performed for the whole data written in the RAM 118 (step S16).

The print processing is executed in accordance with a procedure illustrated in a time chart of FIG. 11. The CPU 117 activates the forced lighting signal b during a time period from time point t1, which corresponds to a time lapse of 0.95 T (where T represents one period) from the rise of the line sink a, to the rise of the succeeding line sink a, as a result of which the laser lighting signal g becomes on (i.e. active). In this way, the laser illumination unit 108 is forcibly lit outside of the printing region in order to allow the horizontal synchronization to be established by making use of the output signal of the first line sensor 134.

Upon incidence of the spot light on the first line sensor 134 at time point t2, the line synch a becomes active, and at that time point, the CPU 117 makes active both clock generating signal c (low active) and the print enable signal e. Parenthetically, the time span intervening between the rise of the given line synch a and that of the succeeding line synch a represents the aforementioned time period T of the print processing for one line.

In response to the activation of the clock generating signal c, the dot-clock generating circuit 122 starts to output the dot-clock signal d to the print control unit 123. Furthermore, the print control unit 123 which responds to the activation of the print enable signal e reads out the data for one current line from the RAM 118. The data read operation is performed, starting from the start address A0. In that case, since the data as read out is the white data, only the forced lighting signal b is reflected onto the laser lighting signal g. Subsequently, at time point t3, the spot light passes through the first line sensor 134. Consequently, the line synch a becomes non-active, in synchronism with the forced lighting signal b which is rendered non-active by the CPU 117.

At time point t4, the address of the RAM 118 coincides with the leftmost data address A1. Thus, the laser beam recording conforming to the printing data is carried out in timing with the dot-clock signal d up to time point t5. At time point t6 at which the time (0.95 T) determined by multiplying the period T by a predetermined coefficient (0.95 in the case of the instant embodiment) has lapsed from the rise of the line synch a (time point t2), the forced lighting signal b is again made active to make preparation for establishing the horizontal synchronization for a succeeding line. At time point t7, the succeeding line synch a is detected.

In the case where the sensitive material for thermal development processing is employed, the operation of the recording apparatus is substantially similar to that described above except for difference in the undermentioned respect due to difference in the position between the first line sensor 134 and second line sensor 136 relative to the left side edge of the sensitive material.

Namely, due to the difference in the distance to the sensitive material 102, the length of the white data written in the RAM 118 decreases for the reason described hereinbefore, as can be seen in FIG. 9B. Besides, because the second line sensor 136 is located closer to the sensitive material 102 than the first line sensor 134, the line synch a rises at time point t'2 with some delay relative to the time point t2, as is shown in FIG. 12. However, so far as the size of the sensitive material 102 is same, the laser beam reaches at the right side edge of the sensitive material 102 at the same time point. Accordingly, the forced lighting signal b for the successive line is made active at a slightly earlier time point than that shown in FIG. 11 (i.e. upon lapse of 0.9 T after the rise of the line synch a (note that the coefficient value differs from the one shown in FIG. 11)).

At this juncture, it should be mentioned that although it has been assumed in the foregoing description that the second line sensor 136 is disposed closer to the sensitive material 102, disposition of the first line sensor 134 and the second line sensor 136 may be reversed, substantially to the same effect.

Figure 13A:
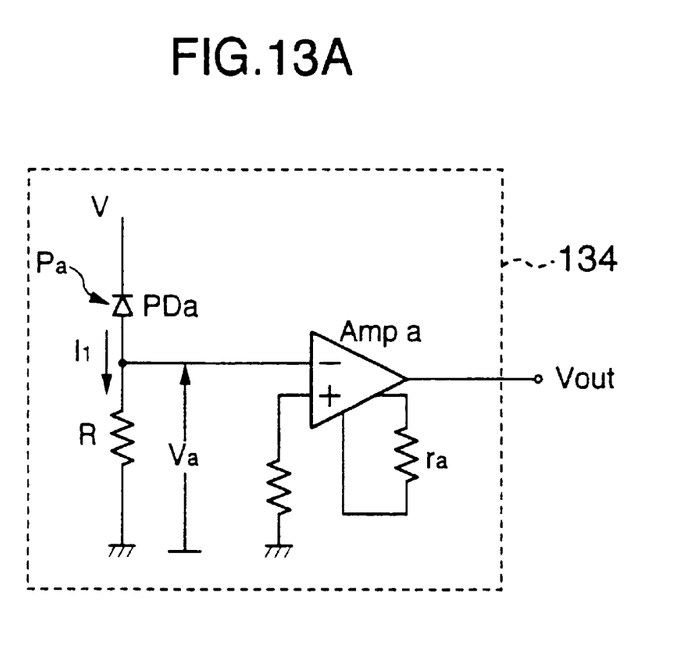
FIG. 13A is a block diagram showing a circuit configuration of a first line sensor employed in the recording apparatus shown in FIG. 7.
Figure 13B:
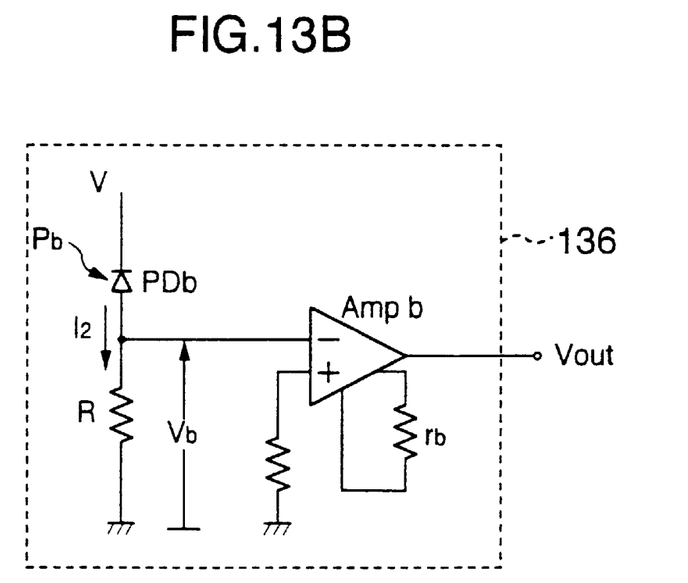
FIG. 13B is a block diagram showing a circuit configuration of a second line sensor employed in the recording apparatus shown in FIG. 7.

FIG. 13A is a block diagram showing a circuit configuration of the first line sensor 134 employed in the recording apparatus according to the instant embodiment, and FIG. 13B is a block diagram showing a circuit configuration of the second line sensor 136 employed in the recording apparatus according to the instant embodiment. As shown in FIG. 13A, the first line sensor 134 comprises a photodiode PDa, a differential amplifier Ampa, and resistors R and ra. As shown in FIG. 13B, the second line sensor 136 comprises a photodiode PDb, a differential amplifier Ampb, and resistors R and rb. In general, the relation between the power P (W) of the laser beam incident on the photodiode PD and the current I (A) generated by the photodiode PD in response to the incident laser beam is given by the following expression:

$$I(A)=S(A/W) \times P(W)$$

where S represents sensitivity of the photodiode PD which assumes a value in dependence on the type or species of the photodiode PD actually employed.

Additionally, the photodiode PD has a maximum permissible power level Pmax for the power P of the incident laser beam, wherein the maximum permissible power level Pmax is in reverse proportion to the sensitivity S. In other words, the maximum permissible power level Pmax is low when the sensitivity S is large and vice versa.

Accordingly, for the photodiode PD exhibiting high sensitivity S, the current I of relatively large magnitude can be obtained even with the laser beam of the relatively low power P. Consequently, it will be unnecessary to set the gain G of the amplifier Amp at an excessively large value. In that case, however, the sensor is not suited for detecting the incident laser beam of higher power P because the maximum permissible power level Pmax is low. By contrast, the photodiode PD of low sensitivity S is suited for detecting the incident laser beam of high power P, because the maximum permissible power level Pmax is high. However, when the power P is low, there is unavailable a sufficiently large current I, which in turn necessitates setting of the gain G of the amplifier Amp at a large value, to a disadvantage.

In consideration of the conditions mentioned above, in the first line sensor 134 and the second line sensor 136 employed in the recording apparatus according to the instant embodiment, the values of the resistors ra and rb are so selected that the ratio of gains between the amplifiers Ampa and Ampb is 5:1 on the presumption that the power Pa of the incident laser beam for the sensitive material for chemical development processing is 1 mW with the power Pb of the incident laser beam for the sensitive material for thermal development processing being 10 mW and that the sensitivities S of the photodiodes PDa and PDb are 0.6 (mA/W) and 0.3 (mA/W), respectively.

As is apparent from the above description, in the recording apparatus according to the instant embodiment, the laser control unit 124 is so designed as to change over the power level of the laser beam outputted from the laser illumination unit 108 under the control by the CPU 117. However, as a modification, two laser illumination units having different powers of the laser beams may be provided so as to be changed over under the control of the CPU 117.

As will now be appreciated from the forgoing description, according to the teachings of the present invention, both the sensitive material for thermal development processing and that for chemical development processing can be used exchangeably in one and the same recording apparatus without any obstacles. Thus, the present invention can contribute to protection of the environment by using the sensitive material for thermal development processing while allowing the exiting widespread development processor for the sensitive material for chemical development to be used continuatively.

Furthermore, because the two line sensors having mutually different sensitivities are used, there can be maintained proper relation between the power of the laser beam and the sensitivity of the line sensor notwithstanding of change-over of the laser power, whereby a stable line synch can be realized, which contributes to improvement of the image quality.

Many modifications and variations of the present invention are possible in the light of the above techniques. It is therefore to be understood that within the scope of the appended claims, the invention may be practiced otherwise than as specifically described.

What is claimed is:

1. A recording apparatus for recording information on a sensitive material with a laser beam, comprising:

data storage means for storing data;

laser illumination means for generating said laser beam;

laser beam scanning means for scanning said laser beam generated by said laser illumination means, at a predetermined position;

transporting means for transporting said sensitive material to said predetermined position;

laser control means for controlling said laser illumination means to generate said laser beam on the basis of said data stored in said data storage means;

intensity change-over means for changing over an intensity of said laser beam illuminating said sensitive material at said predetermined position, according to a type of said sensitive material;

first and second sensor means disposed, respectively, at right and left side positions of a scanning line at said predetermined position for generating synchronization signals in response to an incidence of said laser beam scanned by said laser beam scanning means; and scanning direction change-over means for changing over the scanning direction of said laser beam scanning means according to the type of said sensitive material, wherein said laser control means controls said laser illumination means to generate said laser beam on the basis of said data stored in said data storage means in response to said synchronization signal outputted from one of said first sensor means and second sensor means, whereby said information is recorded on said sensitive material.

2. A recording apparatus according to claim 1, further comprising detecting means for detecting the type of said sensitive material.

3. A recording apparatus according to claim 1, wherein said transporting means comprises:

a pair of rollers spaced apart a distance sufficient to enable said sensitive material to be placed therebetween and to be transported in a secondary scanning direction perpendicular to said scanning line; and a feed motor for rotationally engaging one of said pair of rollers.

4. A recording apparatus according to claim 1, wherein said data stored in said data storage means includes a portion for identifying a type of said sensitive material and said laser beam scanning means comprises:

a polygon mirror disposed in a path of said laser beam for deflecting said laser beam to one of a first primary scanning direction and a second primary scanning direction; and a mirror motor for rotating said polygon mirror in a direction of one of said first primary scanning direction and said second primary scanning direction according to said portion of said data stored in said data storage means for identifying the type of said sensitive material.

5. A recording apparatus according to claim 4, further comprising:

an Fθ lens and a long lens both disposed in a direction of travel of said laser beam between said polygon mirror and said first and second sensor means;

a first mirror disposed between said first sensor means and said sensitive material;

a second mirror disposed between said second sensor means and said sensitive material; and wherein:

said laser beam is deflected onto one of said first mirror and said second mirror and is sensed by one of said first sensor means and second sensor means, respectively.

6. A recording apparatus for recording information on a sensitive material with a laser beam, comprising:

data storage means for storing data;

laser illumination means for generating said laser beam;

laser beam scanning means for scanning said laser beam generated by said laser illumination means, at a predetermined position;

transporting means for transporting said sensitive material to said predetermined position;

laser control means for controlling said laser illumination means to generate said laser beam on the basis of said data stored in said data storage means;

intensity change-over means for changing over an intensity of said laser beam illuminating said sensitive material at said predetermined position, according to a type of said sensitive material; and first and second sensor means each for generating a synchronization signal in response to an incidence of said laser beam generated by said laser illumination means, each of said first and second sensor means being disposed at a start position of a scanning line at said predetermined position, and a sensitivity of said first sensor means being different from a sensitivity of said second sensor means;

wherein said laser control means controls said laser illumination means to generate said laser beam on the basis of said data stored in said data storage means in response to said synchronization signal outputted from said first sensor means or said second sensor means, whereby said information is recorded on said sensitive material.

7. A recording apparatus for recording information on a sensitive material with a laser beam, comprising:

data storage means for storing data;

laser illumination means for generating said laser beam;

laser beam scanning means for scanning said laser beam generated by said laser illumination means, at a predetermined position;

transporting means for transporting said sensitive material to said predetermined position;

laser control means for controlling said laser illumination means to generate said laser beam on the basis of said data stored in said data storage means, whereby said information is recorded on said sensitive material, wherein said recording apparatus exchangeably records said information on a sensitive material for thermal development processing and a sensitive material for chemical development processing with said laser beam.

8. A recording apparatus for recording information on a sensitive material with a laser beam, comprising:

data storage means for storing data;

laser illumination means for generating said laser beam;

laser beam scanning means for scanning said laser beam generated by said laser illumination means, at a predetermined position;

transporting means for transporting said sensitive material to said predetermined position;

laser control means for controlling said laser illumination means to generate said laser beam on the basis of said data stored in said data storage means, whereby said information is recorded on said sensitive material;

intensity change-over means for changing over an intensity of said laser beam illuminating said sensitive material at said predetermined position, according to a type of said sensitive material; wherein said intensity change-over means changes over the intensity of said laser beam according to whether said sensitive material is a sensitive material for one of thermal development processing and chemical development processing.

* * * * *